United States Patent
Zhang et al.

(10) Patent No.: US 10,281,027 B2
(45) Date of Patent: May 7, 2019

(54) VEHICLE STEERING SYSTEMS

(71) Applicant: Ford Global Technologies, LLC., Dearborn, MI (US)

(72) Inventors: Kerry Zhang, Nanjing (CN); Michael Puleri, Berkley, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 252 days.

(21) Appl. No.: 15/446,210

(22) Filed: Mar. 1, 2017

(65) Prior Publication Data
US 2017/0276236 A1 Sep. 28, 2017

(30) Foreign Application Priority Data
Mar. 22, 2016 (CN) .......................... 2016 1 0166512

(51) Int. Cl.
| *F16H 55/18* | (2006.01) |
| *F16H 57/12* | (2006.01) |
| *B62D 3/08* | (2006.01) |
| *B62D 3/12* | (2006.01) |

(52) U.S. Cl.
CPC .............. *F16H 57/12* (2013.01); *B62D 3/08* (2013.01); *B62D 3/123* (2013.01); *F16H 2057/127* (2013.01)

(58) Field of Classification Search
CPC ........... F16H 57/127; F16H 7/12; B62D 3/08; B62D 3/123
See application file for complete search history.

(56) References Cited

U.S. PATENT DOCUMENTS

| 3,771,383 | A | * | 11/1973 | Forster | B62D 3/08 |
| | | | | | 74/499 |
| 5,622,085 | A | | 4/1997 | Kostrzewa | |
| 6,247,375 | B1 | * | 6/2001 | Gierc | B62D 3/12 |
| | | | | | 74/388 PS |
| 8,256,315 | B2 | | 9/2012 | Song | |
| 2007/0163375 | A1 | * | 7/2007 | Counts | B62D 3/123 |
| | | | | | 74/422 |
| 2007/0209463 | A1 | | 9/2007 | Song et al. | |
| 2007/0209464 | A1 | | 9/2007 | Roline | |
| 2007/0216125 | A1 | | 9/2007 | Baxter | |
| 2008/0034903 | A1 | * | 2/2008 | Hafermalz | B62D 3/123 |
| | | | | | 74/89.19 |
| 2013/0112024 | A1 | * | 5/2013 | Crossman | B62D 3/123 |
| | | | | | 74/422 |

FOREIGN PATENT DOCUMENTS

EP 0324230 7/1989

* cited by examiner

*Primary Examiner* — Jake Cook
(74) *Attorney, Agent, or Firm* — Ray Coppiellie; Kolitch Romano, LLP (57) ABSTRACT

A steering system comprises a first engagement member; a second engagement member to be engaged with the first engagement member; a supporting portion to support the second engagement member; and an elastic member at least partially enclosed in the supporting portion to apply a preload to the second engagement member and absorb an impact load. The elastic member has a first deformation under a first load and at least a second deformation under a second load greater than the first load, and a ratio of the first load to the first deformation is less than a ratio of the second load to the second deformation.

20 Claims, 10 Drawing Sheets

VEHICLE STEERING SYSTEMS

RELATED APPLICATION(S)

This application claims the benefit of Chinese New Invention Patent Application No.: CN 201610166512.4, filed Mar. 22, 2016, the entire contents thereof being incorporated herein by reference.

FIELD OF THE INVENTION

The application relates generally to a steering system in a vehicle.

BACKGROUND

A vehicle normally includes a steering system to meet steering requirement of a user. There have been various types of steering systems in the existing art. For instance, U.S. Pat. No. 5,622,085 discloses a rack and pinion steering system including a rack bar and a pinion gear which are enclosed by a housing. Movement of the rack bar relative to the housing and pinion gear is supported and guided by a yoke. The yoke includes a yoke spring to press the yoke against the rack bar.

SUMMARY

According to one aspect of the present disclosure, a steering system is provided. The steering system may include a first engagement member; a second engagement member engaged with the first engagement member; a supporting portion to support the second engagement member; and an elastic member at least partially enclosed in the supporting portion to apply preload to the second engagement member and to absorb an impact load. The elastic member may have a first deformation under a first load and at least a second deformation under a second load greater than the first load and a ratio of the first load to the first deformation may be less than a ratio of the second load to the second deformation.

In one embodiment, a relationship of load with deformation of the elastic member may be non-linear.

In another embodiment, a relationship of the load with deformation may be linear at a first lower range of load and non-linear at a second higher range of load.

In another embodiment, the elastic member may be a non-linear coil spring.

In another embodiment, the elastic member may be a non-linear volute spring.

In another embodiment, the elastic member may be a combination of at least a first spring with a first length and a first stiffness coefficient and a second spring with a second length and a second stiffness coefficient. The first length may be greater than the second length and the first stiffness coefficient may be less than the second stiffness coefficient.

In another embodiment, the first engagement member may be a gear and the second engagement member may be a rack.

In another embodiment, the steering system may further include a housing that at least partially encloses the gear, the rack and a yoke. The yoke may include a yoke body and a yoke plug, the yoke body may have a first side adjacent to the rack and a second side opposing the first side, and a central cavity formed in a recess at the second side. The supporting portion may be the yoke body and the elastic member may be at least partially disposed in the central cavity.

In another embodiment, the yoke plug may be adjacent to the second side of the yoke body and define a clearance therebetween.

In another embodiment, the central cavity defined between the yoke body and the yoke plug may have a first inner diameter at a portion adjacent to the yoke plug and a second inner diameter at a portion away from the yoke plug. The first inner diameter may be smaller than the second inner diameter. The elastic member may have a first diameter and a second diameter greater than the first diameter. A portion of the elastic member with the first diameter may be at least partially positioned in the central cavity with the first inner diameter and a portion of the elastic member with the second diameter may be at least partially positioned in the central cavity with the second inner diameter.

In another embodiment, the first engagement member may be a ball-nut with rack-teeth coupled on a worm-gear, and the second engagement member may be a sector gear.

In another embodiment, the steering system may further include a housing to enclose the ball-nut and the section gear. The supporting portion may be a sector shaft linked to the sector gear.

In another embodiment, the sector shaft may have a cavity at one end to at least partially receive the elastic member.

In another embodiment, a central axis of the sector shaft may be substantially parallel to a direction of deformation of the elastic member, and a distance between an end of the teeth of the sector shaft and the central axis varies along the central axis. The ball-nut may have a contact surface to engage with the sector gear, and the elastic member may apply a preload to the sector gear and absorb an impact load along a direction of the central axis.

In another embodiment, the steering system may further include an end cover installed on an opening of the housing, a clearance may be defined between the end cover and an end of the sector shaft.

In another embodiment, the steering system further includes an adjusting bolt installed on the end cover against the elastic member.

In another embodiment, the cavity may be formed with a first cavity segment and a second cavity segment, the first cavity segment may be configured to receive at least a portion of the elastic member and the second cavity segment may be configured to receive at least a portion of the adjusting bolt. The first cavity segment may have a first inner diameter and the second cavity segment may have a second inner diameter greater than the first inner diameter.

In another embodiment, the first segment may have an end cavity with a first inner diameter and a central cavity with a second inner diameter greater than the first inner diameter. The end cavity may be space away from the second cavity segment and the central cavity may be adjacent to the second cavity segment. The elastic member may have a first diameter and a second diameter greater than the first diameter, and the portion of the elastic member with the first diameter may be at least positioned within the central cavity having the first inner diameter.

In another embodiment, a distance between an end of the tooth of the sector gear and the central axis may vary linearly along the central axis.

According to another aspect of the present disclosure, a vehicle is provided to include a steering system according to one or more example embodiments of the present disclosure.

One or more advantageous features as described herein will be readily apparent from the following detailed description of one or more embodiments when taken in connection with the accompanying drawings.

BRIEF DESCRIPTION OF THE DRAWINGS

For a complete understanding of one or more embodiments of the present invention, reference should now be made to the one or more embodiments illustrated in greater detail in the accompanying drawings and described below wherein:

FIGS. 4A and 4B schematically illustrate a recirculating ball style steering system according to one embodiment of the present invention.

DETAILED DESCRIPTION OF ONE OR MORE EMBODIMENTS

As referenced in figures, the same or similar reference numerals in the drawings may be used herein to refer to the same or similar components. In the description below, the parameters and components are described in one or more embodiments. These parameters and components are used as examples and are not meant to be limiting. The drawings referenced herein are schematic and associated views thereof are not necessarily drawn to scale.

Among various types of vehicle steering systems, a rack and pinion steering gear has been widely applied in passenger vehicles. In another example, a recirculating ball style steering system has been applied in heavy-duty vehicles and the recirculating-ball style steering system may sustain heavy loads. In the rack and pinion steering gear, a yoke is normally provided at one side of a rack to support and to guide movement of the rack, and a yoke spring is provided in the yoke to apply preload to the rack such that the rack is properly engaged with a pinion. Additionally, the yoke spring may function to absorb the vibration and impact force. The inventors of the present disclosure have recognized that, to meet the vibration and impact absorbing performance, the yoke spring may be designed to be as stiff as possible, however, such design may lead to a higher preload on the rack such that the engagement between the rack and the pinion may be tight, resulting in high friction and fast wearing. Additionally, a user may need to apply a large force to a steering wheel, which may cause undesirable user experience. A similar dilemma exists with the recirculating-ball style steering system. As will be detailed in the following embodiments, the engagement between the sector gear and the ball-nut teeth can be adjusted by a spring and screw, and the spring may act to absorb vibration and impacts. If the spring is designed with high stiffness to absorb the large impact load, the friction between the sector gear and ball-nut teeth may become high hence resulting fast wearing and undesirable user experience during steering. The steering system of the present disclosure can solve at least some of the issues described above.

Figure 1:
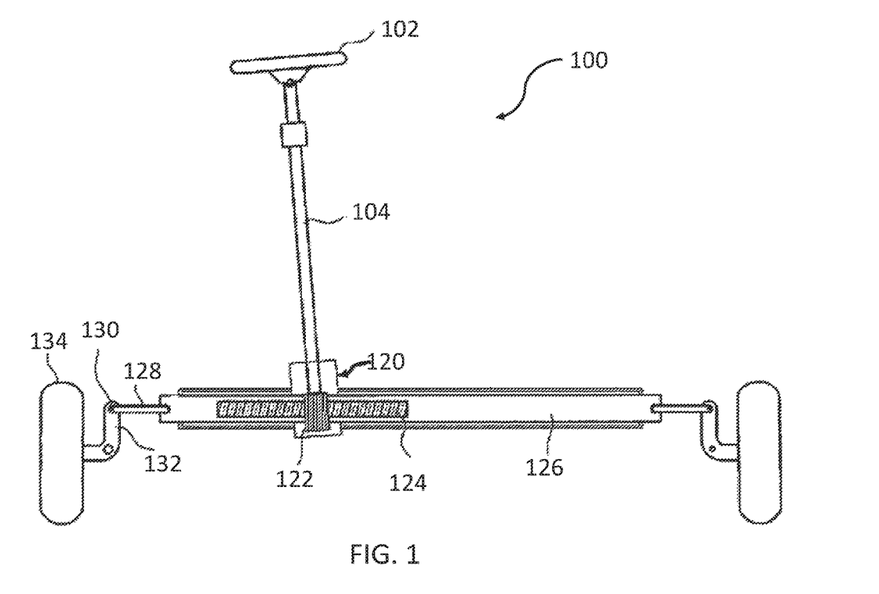
FIG. 1 depicts a representative rack and pinion gear steering system in a vehicle in which illustrative embodiments may be implemented.

FIG. 1 depicts a representative rack and pinion gear steering system in a vehicle in which illustrative embodiments may be implemented. As shown in FIG. 1, a steering system 100 may include a steering wheel 102 operated by a user, a steering shaft 104 connected to the steering wheel 102 and a gear system 120. The gear system 120 may include a pinion gear 122 and a rack gear 124 engaged with the pinion gear 122. The rack gear 124 translates a rotational movement into a linear movement. The rack gear 124 may be supported on a rack bar 126. The rack bar 126 may be coupled to a wheel 134 via tie rods 128, ball joints 130 and knuckles 132, thereby the linear movement may be translated to the wheel 134 to change its direction. It should be appreciated that different connections may be adopted in the vehicle steering system 100 of the present disclosure.

Figure 2:
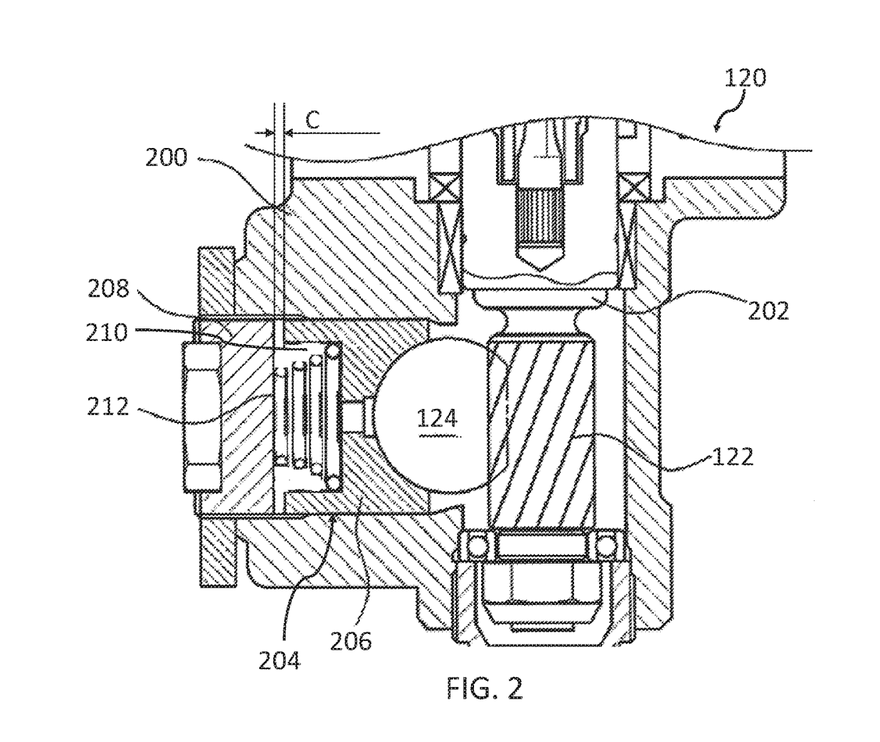
FIG. 2 schematically depicts a cross-sectional partial view of the rack and pinion steering system according to one embodiment of the present disclosure.

FIG. 2 schematically depicts a cross-sectional partial view of the rack and pinion steering system, illustrating the gear system 120. The gear system 120 may include a housing 200, a pinion gear 122 enclosed therein, a rack gear 124 engaged with the pinion gear 122 and a yoke 204. The pinion gear 122 may be supported on a gear shaft 202 which may be further connected to the steering shaft 104. The rack gear 124 may be supported by the yoke 204 such that the rack gear 124 may be properly engaged with the pinion gear 122 with a suitable preload.

The yoke 204 may include a yoke body 206 to support the rack gear 124 and a yoke plug 208 fixed on the housing 200 via bolts or other appropriate connections. In the depicted embodiment, one side of the yoke body 206 is adjacent to the rack gear 124, another side of the yoke body 206 is configured to be recessed to define a central cavity 210 therein to receive a yoke spring 212. The yoke spring 212 is at least partially accommodated in the central cavity 210 such that one end of the yoke spring 212 contacts a yoke plug 208 and another end of the yoke spring 212 contacts the yoke body 206.

Again referring to FIG. 2, in some embodiments, a clearance C may be formed between the yoke body 206 and the yoke plug 208. The yoke spring 212 may function properly as a result of the existence of clearance C. In other words, the yoke spring 212 may function better to apply a preload and absorb an impact load. For example, the yoke spring 212 may apply the preload to the yoke body 206 to ensure proper engagement between the pinion gear 122 and the rack gear 124. On the other hand, the yoke spring 212 may be subjected to a load and absorb the load. For instance, in the bumpy road conditions or the like, when subjected to an impact along the axial direction of the yoke spring 212, the yoke spring 212 may absorb the impact to eliminate or minimize the direct impact between the yoke plug 208 and yoke body 206.

As shown in FIG. 2, the yoke spring 212 may have variable stiffness coefficients. In the depicted embodiment, the yoke spring 212 has a varied spring diameter, such that it has a changeable stiffness coefficient within a certain load range. In one example, the yoke spring 212 has a first deformation x1 under a first load F1, and a second deformation x2 under a second load F2 greater than F1, a ratio of F1 to x1 is lower than that of F2 to x2, i.e., F1/x1<F2/x2 while F1>F2. In this manner, the yoke spring 212 may apply a suitable preload to the yoke body 206 and thus to the rack gear 124 with a desired deformation at a lower load range, and may absorb the force with a relatively small deformation while subjected to a greater impact force (i.e., at higher load range).

In some conventional steering system, to enhance impact absorb performance, a spring with a large stiffness coefficient k (i.e. the ratio of deformation x/load F) is adopted and such spring tends to apply a greater preload than needed to the rack gear 124. In other conventional system, to ensure a suitable preload to the rack gear 124 a spring with lower stiffness coefficient k is adopted while such a spring will not be able to absorb a large impact even with maximum deformation. In one example embodiment of the present disclosure, some of the above issues may be addressed by using a yoke spring with varied stiffness coefficients at different load ranges. In this way, the spring can be deformed to a different extent depending on the load and thus meet the requirements at different conditions.

Figure 3A:
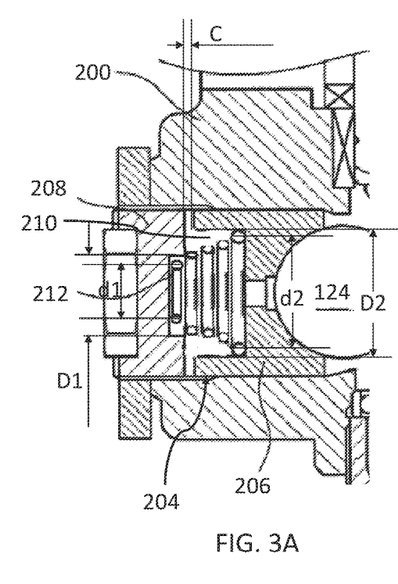
FIG. 3A schematically depicts a yoke and a yoke spring in a rack and pinion steering system according to one embodiment of the present disclosure.

FIG. 3A schematically depicts a yoke 204 and a yoke spring 212 in a rack and pinion steering system according to one embodiment of the present disclosure. As shown in FIG. 3A, a central cavity 210 defined by the yoke body 206 and the yoke plug 208 may have a first inner diameter D1 at a portion adjacent to the yoke plug 208 and a second inner diameter D2 at a portion away from the yoke plug 208. The first inner diameter D1 may be smaller than the second inner diameter D2. The elastic member 212 may have a first diameter d1 and a second diameter d2 greater than the first diameter d2. A portion of the elastic member 212 with the first diameter d1 may be at least partially positioned in the portion of the central cavity 210 having the first inner diameter D1 and a portion of the elastic member 212 with the second diameter d2 may be at least partially positioned in the portion of the central cavity 212 having the second inner diameter D2. It should be appreciated that the yoke spring 212 may be reversely positioned. In other words, a portion of the yoke spring 212 with the smaller diameter may be disposed close to the rack gear 124, and a corresponding portion of the yoke body 206 may be configured to receive the portion of the yoke spring 212 with the smaller diameter to provide stability of the spring. Additionally or alternatively, in other examples, the yoke spring 212 may have different structures, and the yoke plug 208 and yoke body 206 may have corresponding configurations to receive the yoke spring 212 to provide stability.

Figure 3B:
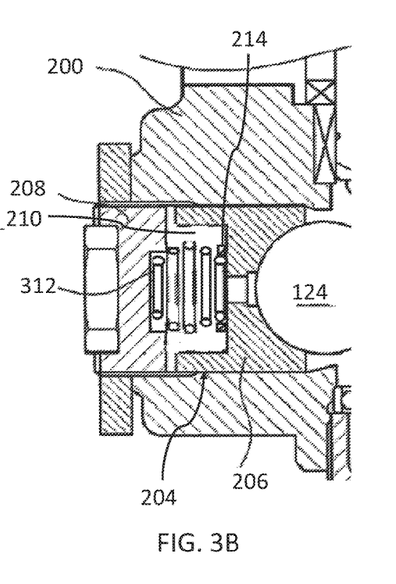
FIG. 3B schematically depicts a yoke and a yoke spring in a rack and pinion steering system according to another embodiment of the present disclosure.

FIG. 3B schematically depicts a yoke 204 and a yoke spring 312 in a rack and pinion gear steering system according to another embodiment of the present disclosure. In the depicted embodiment, two end portions of the yoke spring 312 have a smaller diameter than a diameter of a middle portion. To secure the spring 312, protrusions 214 may be provided on the yoke body 206 to restrict the movement of one end of yoke spring 312. Protrusions 214 may protrude from a surface of the yoke body 206 that is adjacent to the pinion rack 124 to accommodate one end of the yoke spring 312. Similar to the embodiment shown in FIG. 3A, a surface of the yoke plug 208 may be recessed to secure another end of the yoke spring 312. Additionally or alternatively, a protrusion may be provided to extend into the center of the yoke spring 312 to limit the lateral movement of the yoke spring 312 (not shown). Depending on the shape of the yoke spring 312, the cavity may be configured to have different inner diameters and shapes, and optionally protrusions arranged either around the spring or extending into the center of the yoke spring may be disposed to secure the yoke spring 312.

Figure 4A:
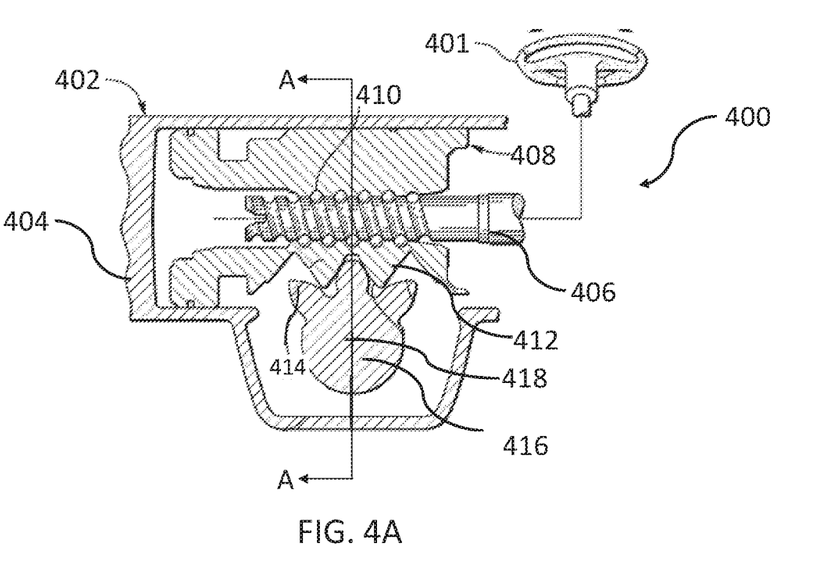
Figure 4B:
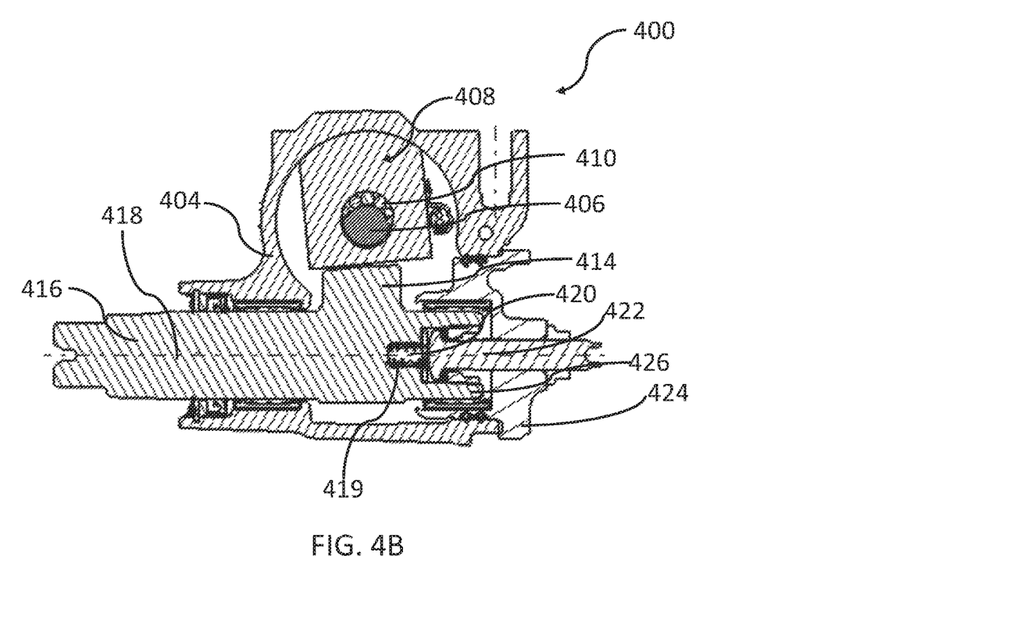
FIG. 4B is a cross-sectional view along the A-A section of the recirculating ball style steering system referenced in FIG. 4A.

FIGS. 4A and 4B schematically illustrate a recirculating ball style steering system 400 according to one embodiment of the present invention. FIG. 4B is a cross-sectional view along the A-A section of the recirculating ball style steering system referenced in FIG. 4A. As shown in FIG. 4A, the steering system 400 may include a steering wheel 401 and a recirculating-ball style gear box 402 coupled to the steering wheel 401 via a steering shaft (not shown). The recirculating-ball style gear box 402 includes a housing 404, a worm gear 406 at least partially positioned therein, and a ball-nut 408 being provided on the worm gear 406. To minimize the friction and wearing of the worm gear 406 and ball-nut 408, there may be no direct contact between the worm gear 406 and ball-nut 408. Ball-bearing 410 may be disposed between the threads formed between the worm gear 406 and ball-nut 408 to realize rolling friction. The worm gear 406 and ball-nut 408 may constitute a first set of transmission pair. The ball-nut 408 includes rack teeth with a surface 412. The surface 412 of the rack teeth may be engaged with a sector gear 414 while the sector gear 414 may be integrally formed on the sector shaft 416. The sector gear 414 and the sector shaft 416 may constitute a second set of transmission pair.

Referring to FIG. 4B, the sections of sector shaft 416 along a central axis 418 is shown. When the steering wheel 401 rotates, the steering shaft causes the worm gear 406 to rotate, which further translates the force to the ball-nut 408 via ball bearings 410 such that the ball-nut 408 moves along the worm gear 406. The rack-teeth surface 412 of the ball-nut 408 further rotates the sector gear 414 and the sector shaft 416 to cause the wheels to turn via other transmission devices (not shown). In some embodiments, the sector gear 414 may have a tapered sector gear end surface, thereby a spring may be disposed along the central axis 418 of the sector shaft 416 to adjust teeth clearance between the sector gear 414 and the rack-teeth surface 412 of the ball-nut 408.

Figure 5:
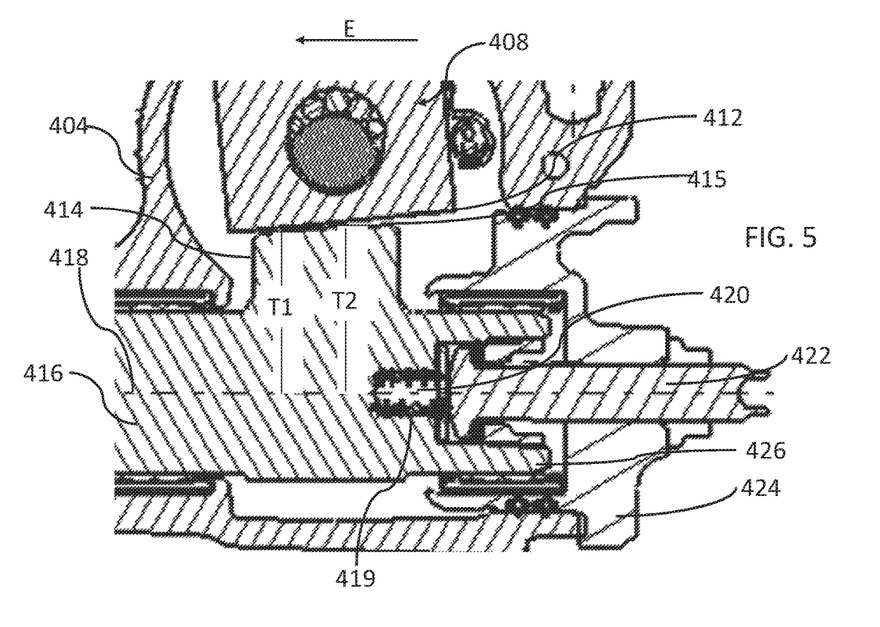
FIG. 5 is an enlarged view of the sector gear of the recirculating ball style steering system in FIG. 4B.

Again referring to FIG. 4A, FIG. 4B and further in view of partially enlarged view FIG. 5, in the depicted embodiment, the sector gear 414 has a tapered sector end surface 415 relative to the central axis 418 of the sector shaft 416. In other words, a distance between an end surface 415 of the sector gear 414 and the central axis 418 varies along the length of the central axis 418. As shown in FIG. 5, a distance T1 is not the same with a distance T2. In the depicted embodiment, T1<T2. As the ball-nut 408 has a surface, i.e. the rack-teeth surface 412 that engages with the sector gear 414 along the central axis 418, an engagement clearance between the sector gear 414 and the ball nut 408 and an engagement force between the sector gear 414 and the ball nut 408 may be adjusted by disposing a spring 420 in the sector shaft to absorb an impact and to apply a preload to the sector gear 414 along the central axis 418. As shown in FIG. 5, in the direction of the arrow E, the spring 420 may cause the sector shaft 416 to move along the direction E, which in turn causes the sector gear 414 on the sector shaft 416 to move along direction E, thereby enabling the end surface 415 of the sector gear 414 to engage the ball-nut 408 more closely. In some embodiments, the distance between the end surface of the sector gear 414 and the central axis 418 may vary linearly along the length of the central axis 418. In some embodiments, the distance between the end surface of the sector gear 414 and the central axis 418 may vary non-linearly. In some embodiments, the end surface of the sector gear may be arc shaped.

Figure 6A:
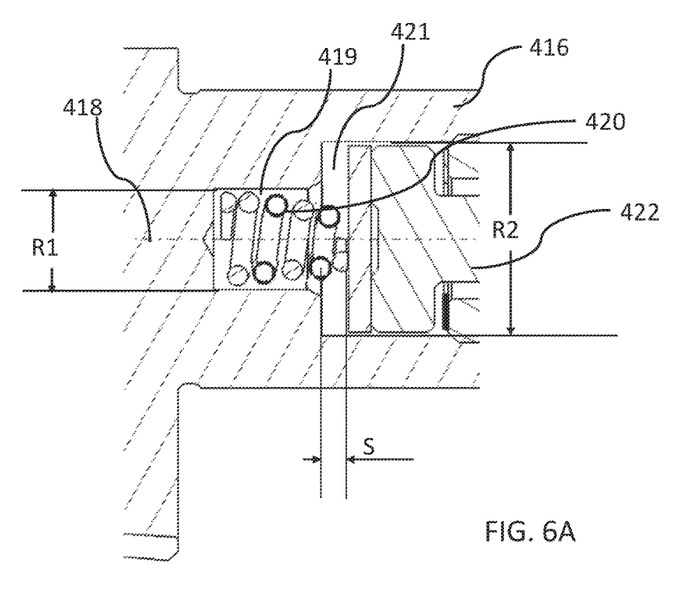
FIG. 6A is an enlarged cross-sectional view of the sector shaft of the recirculating ball style steering system according to one embodiments of the present disclosure.

FIG. 6A is an enlarged cross-sectional view of the sector shaft of the re-circulating ball type steering system in FIG. 4A-4B and FIG. 5. Referring to FIG. 6 and FIG. 4A-5, in the depicted embodiment, an end cover 424 is provided on an opening in the housing 404 at an end of the sector shaft 416. A clearance is defined between the end cover 424 and an end portion 426 of the sector shaft 416, and a cavity 419 is formed at one end of the sector shaft 416. The spring 420 is at least partially positioned in the cavity 419. An adjusting bolt 422 is disposed on the end cover 424 against the spring 420. Referring to FIG. 6A, one end of the sector shaft 416 may be recessed to form a first cavity segment 419 and a second cavity segment 421. The first cavity segment 419 may be configured to mainly receive the spring 420 while the second cavity segment 421 may be configured to receive at least a portion of the adjusting bolt 422. The first cavity segment 419 may have a first inner diameter R1, the second cavity segment 421 may have a second segment inner diameter R2 greater than the first inner diameter R1. In the depicted embodiment, the central axis 418 of the sector shaft 416 is substantially parallel to the deformation direction of the spring 420. The deformation of the spring 420 may apply a preload to the sector shaft 416 and absorb shocks or impacts along the central axis 418 of the sector shaft 416. In some embodiments, the adjusting bolt 422 may adjust the compression status of the spring 420 (i.e. the distance S may be adjusted) thereby cause the spring 420 to apply the load to the sector shaft 416, and the sector gear 414 may engage the ball-nut 408 at a predetermined force. The spring 420 may also absorb impacts along the sector shaft 416 due to vibrations of wheels or the like to eliminate or minimize the impacts between the sector shaft 416 and the end cover 424.

Figure 6B:
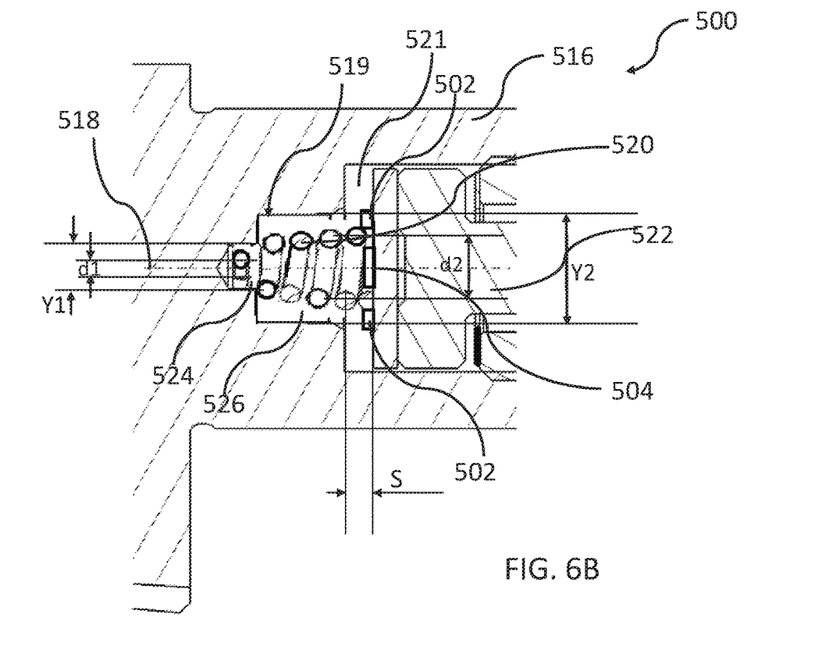
FIG. 6B is a cross-sectional view of the sector shaft of the recirculating ball style steering system according to another embodiment of the present disclosure.

FIG. 6B illustratively depicts an enlarged cross-sectional view of a recirculating ball type steering system 500 according to another embodiment of the present disclosure. In the depicted embodiment, a cavity formed in a sector shaft includes a first cavity segment 519 and a second cavity segment 521. The first cavity segment 519 includes an end cavity 524 with a first inner diameter of Y1 at a portion away from the second segment 521 and a central cavity 526 with a second inner diameter of Y2 greater than the first inner diameter Y1. The spring 520 has a first diameter d1 and a second diameter d2 greater than the first diameter d1, a spring portion with the first diameter d1 is at least partially positioned in the end cavity 524. A spring portion with the second diameter d2 is at least partially positioned in the central cavity 526. It should be appreciated that the spring 520 may be reversely positioned and the inner diameter of the cavity may be adjusted to accommodate the spring 520 so as to provide better stability. In the example shown in FIG. 6B, peripheral protrusions 502 and central protrusions 504 may be formed at the end surface of the adjusting bolt 522 that contacts the spring 520. The peripheral protrusions and the central protrusions may define the position of the spring 520 and restrict its lateral movement. It should be appreciated that the dimension of the inner diameter as well as the shape of the cavity in the sector shaft may be varied depending on the shape of the spring. Further, the protrusions may be configured to be surround the spring or extend into the center of the spring to restrict the position of the spring 520.

In a recirculating ball style steering system with a spring in the sector shaft, a similar dilemma to that mentioned above with the rack-pinion type gear box exists for the spring. The recirculating ball style steering system of the present disclosure can address the issue by using the springs with variable stiffness coefficient k under different loads.

Figure 7:
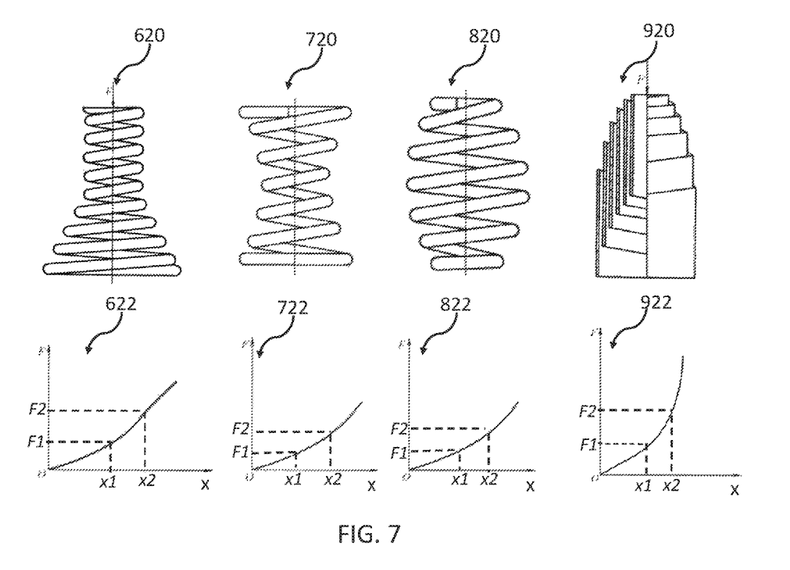
FIG. 7 schematically illustrates example elastic members used in one or more embodiments of the present disclosure and the characteristic curves of the elastic members.

FIG. 7 schematically illustrates example elastic members used in one or more embodiments of the present disclosure and the characteristic curves of the elastic members. In these examples, the relationship of load or force F with deformation x is non-linear. In other words, the elastic members are shown to be non-linear springs. Elastic members 620, 720 and 820 are non-linear coil springs. The elastic member 920 is a non-linear volute spring. The elastic members 620, 720, 820 and 920 have a characteristic curve 622, 722, 822 and 922, respectively.

The yoke spring and spring described above (referred to as elastic members herein or elsewhere) have different stiffness coefficient k under different load conditions. Specifically, the elastic member has a first deformation x1 under a first load F1 and it has a second deformation x2 under a second load F2. The ratio of the first load F1 and the first deformation x1 is lower than a ratio of the second load F2 and the second deformation x2. It should be appreciated that there is no special restrictions to the shape of the elastic member as long as the characteristic curve may present variable stiffness coefficient. In some examples, it is desirable to select an elastic member having a greater difference in the stiffness (k2−k1) so that the elastic member may provide a smaller initial load and absorb a large impact force when subject to a greater load.

In another example, the relationship of the load F with deformation x is linear at a first lower range of load and thus relatively consistent engagement force can be achieved during teeth clearance adjustment when a lower load or force is required. Specifically, the gap between the meshed teeth may become larger due to wearing, however force applied by the elastic member may ensure consistent engagement even with wearing. Thus, a linear relationship at lower range of load (in other words consistent stiffness coefficient) may ensure the stability and consistency of the teeth clearance and engagement force. On the other hand, the non-liner relationship of the load F with deformation x at a second higher range of load may ensure that the spring may absorb a large load with relatively small deformation.

In another example, the relationship of load or force F with deformation x of an elastic member may be non-linear at lower range and higher range of load. Particularly, in one non-limiting example as shown in FIG. 4 to FIG. 6B, where the end surface of the sector gear being arc shaped, it may advantageously utilize the current example.

Figure 8:
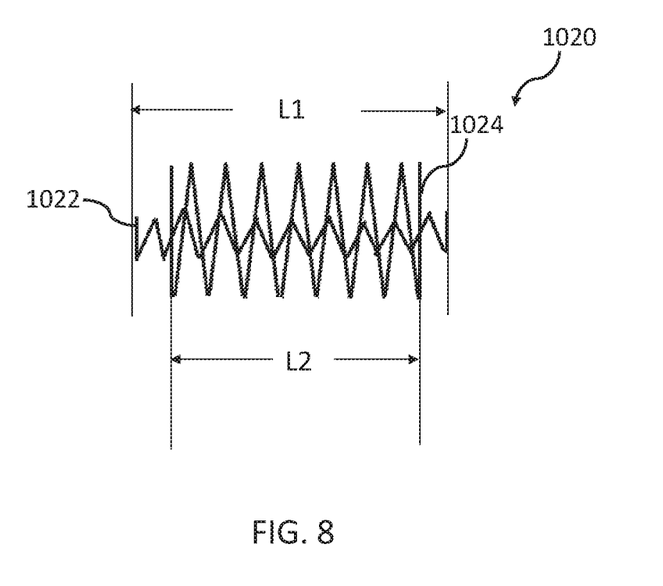
FIG. 8 schematically illustrates an example elastic member implemented in one or more embodiments of the present disclosure.

FIG. 8 schematically illustrates an elastic member 1020 that may be implemented in some embodiments of the present disclosure. As shown in FIG. 8, the elastic member 1020 is a combination of a first linear spring 1022 with a first length L1 and a first stiffness coefficient K1 and a second linear spring 1024 with a second length L2 and a second stiffness coefficient K2. The first length L1 is greater than the second length L2 and the first stiffness coefficient K1 is lower than the second stiffness coefficient K2. When elastic member 1020 is implemented in the rack and pinion gear steering system or the recirculating ball style steering system, the first spring 1022 with the first length L1 and first lower stiffness K1 will function at a lower preload or force to ensure a suitable force of rack and pinion engagement or rack-teeth and sector gear engagement such that over wearing may be avoided and a suitable steering force may be provided. When subjected to a larger impact, the first spring 1022 is compressed to the second length L2, then the second spring 1024 may be compressed together with the first spring 1022 to absorb impact. As the second spring 1024 has a relatively greater stiffness coefficient K2, it may absorb a larger load or force than the first spring 1022 with the same deformation. With the combination of first and second spring 1022 and 1024, an even larger load could be absorbed. In the depicted embodiment, the two springs may be arranged co-axially as shown in FIG. 8. It should be appreciated that the two springs may be arranged in any suitable configuration. In the elastic member consisting of more than one spring, the number of springs or characteristic curves may vary. In some embodiments, only linear springs may be adopted and in other embodiments, both linear and non-linear springs may be adopted.

In the non-limiting examples of the present disclosure, by providing a combination of at least two elastic members of different stiffness coefficients, a relatively lower preload could be applied by the elastic member with an initial smaller deformation, and a larger impact load could be absorbed with certain deformation because of the greater stiffness coefficient of the elastic member at a greater load, In this way, conflicts requirement between a suitable engagement force and high impact absorbing performance mentioned above can be met. By providing an elastic member with different stiffness coefficients, suitable teeth clearance and engagement force could be achieved meanwhile high impact force may be absorbed and thus desired performance can improved at low cost.

As mentioned above, one or more non-limiting examples of the present disclosure provides a steering system with an improved ability to apply a preload and absorb an impact. Although the present disclosure is discussed with examples of rack and pinion steering system and recirculating ball style steering system, it should be appreciated that other vehicle steering systems with other steering gears or accessory (power assisted steering) may also benefit from implementation of the present disclosure as long as an elastic member is used to adjust the teeth clearance and absorb load. Although the present disclosure is mainly discussed under the context of vehicles, it can be contemplated that the present disclosure may be applied in other suitable fields as well. Those who skilled in the art will readily recognize from such discussion, and from the accompanying drawings and claims that various changes, modifications and variations can be made therein without departing from the true spirit and fair scope of the invention as defined by the following claims.

What is claimed is:

1. A steering system comprising:
a first engagement member;
a second engagement member to be engaged with the first engagement member;
a supporting portion to support the second engagement member;
an elastic member at least partially enclosed in the supporting portion to apply a preload to the second engagement member and absorb an impact load;
wherein the elastic member has a first deformation under a first load and at least a second deformation under a second load greater than the first load, and a ratio of the first load to the first deformation is less than a ratio of the second load to the second deformation.

2. The steering system of claim 1, wherein a relationship of the first load with the first deformation of the elastic member is non-linear and a relationship of the second load with the second deformation of the elastic member is non-linear.

3. The steering system of claim 1, wherein a relationship of the first load with the first deformation is linear at a first lower range of load and a relationship of the second load with the second deformation is non-linear at a second higher range of load.

4. The steering system of claim 1, wherein the elastic member is a non-linear coil spring.

5. The steering system of claim 1, wherein the elastic member is a non-linear volute spring.

6. The steering system of claim 1, wherein the elastic member is a combination of at least a first spring with a first length and a first stiffness coefficient and a second spring with a second length and a second stiffness coefficient, and wherein the first length is greater than the second length and the first stiffness coefficient is less than the second stiffness coefficient.

7. The steering system of claim 1, wherein the first engagement member is a pinion gear and the second engagement member is a rack gear.

8. The steering system of claim 7, further comprising a housing to at least partially enclose the pinion gear, the rack gear and a yoke, wherein the yoke includes a yoke body and a yoke plug, wherein the yoke body has a first side adjacent to the rack gear and a second side opposing the first side, and a central cavity formed in a recess at the second side, and wherein the supporting portion is the yoke body and the elastic member is at least partially disposed in the central cavity.

9. The steering system of claim 8, wherein the yoke plug is adjacent to the second side of the yoke body and defines a clearance therebetween.

10. The steering system of claim 9, wherein the central cavity defined between the yoke body and the yoke plug has a first inner diameter at a portion adjacent to the yoke plug and a second inner diameter at a portion away from to the yoke plug, where the first inner diameter is smaller than the second inner diameter, wherein the elastic member has a first diameter and a second diameter greater than the first diameter, a portion of the elastic member with the first diameter is at least partially positioned in the central cavity with the first inner diameter and a portion of the elastic member with the second diameter is at least partially positioned in the central cavity with the second inner diameter.

11. The steering system of claim 1, wherein the first engagement member is a ball-nut with rack-teeth, and the ball-nut is supported on a worm-gear, and wherein the second engagement member is a sector gear.

12. The steering system of claim 11, further comprising a housing to enclose the ball-nut and the section gear, and wherein the supporting portion is a sector shaft linked to the sector gear.

13. The steering system of claim 12, wherein the sector shaft has a cavity at its end to at least partially receive the elastic member.

14. The steering system of claim 13, wherein a central axis of the sector shaft is substantially parallel to a direction of deformation of the elastic member, and a distance between an end of the teeth of the sector shaft and the central axis varies along the central axis, and wherein the ball-nut has a contact surface to mesh with the sector gear, and the elastic member applies a preload to the sector gear and absorb an impact load along a direction of the central axis.

15. The steering system of claim 14, further comprising an end cover installed on an opening of the housing, and wherein a clearance is defined between the end cover and an end of the sector shaft.

16. The steering system of claim 15, further comprising an adjusting bolt disposed on the end cover against the elastic member.

17. The steering system of claim 16, wherein the cavity is formed with a first cavity segment and a second cavity segment, the first cavity segment is configured to receive at least a portion of the elastic member and the second cavity segment is configured to receive at least a portion of the adjusting bolt, the first cavity segment has a first segment inner diameter and the second cavity segment having a second segment inner diameter greater than the first cavity inner diameter.

18. The steering system of claim 16, wherein the cavity is formed with a first cavity segment and a second cavity segment, wherein the first cavity segment includes an end cavity with a first inner diameter and a central cavity with a second inner diameter greater than the first inner diameter, wherein the end cavity is spaced away from the second cavity segment and the central cavity is adjacent to the second cavity segment, and wherein the elastic member has a first diameter and a second diameter greater than the first diameter, a portion of the elastic member with the first diameter is at least partially positioned within the end cavity and a portion of the elastic member with the second diameter is at least partially positioned in the central cavity.

19. The steering system of claim 14, wherein the distance between an end surface of the tooth of the sector gear and the central axis varies linearly.

20. A vehicle includes a steering system, the steering system comprising:
- a first engagement member;
- a second engagement member to be engaged with the first engagement member;
- a supporting portion to support the second engagement member;
- an elastic member at least partially enclosed in the supporting portion to apply a preload to the second engagement member and absorb an impact load;
- wherein the elastic member has a first deformation under a first load and at least a second deformation under a second load greater than the first load, and wherein a ratio of the first load to the first deformation is less than a ratio of the second load to the second deformation.

* * * * *